Aug. 12, 1930.　　E. A. SPERRY, JR　　1,772,787
AUTOMATIC PILOT FOR SHIPS
Filed May 16, 1924　　5 Sheets-Sheet 2

Inventor
ELMER A. SPERRY, JR.
By his Attorney
Herbert H. Thompson

Aug. 12, 1930.  E. A. SPERRY, JR  1,772,787
AUTOMATIC PILOT FOR SHIPS
Filed May 16, 1924  5 Sheets-Sheet 3

Inventor
ELMER A. SPERRY, JR.
By his Attorney
Herbert H. Thompson

Inventor
Elmer A. Sperry, Jr.
By his Attorney
Herbert H. Thompson

Patented Aug. 12, 1930

1,772,787

UNITED STATES PATENT OFFICE

ELMER A. SPERRY, JR., OF BROOKLYN, NEW YORK, ASSIGNOR, BY MESNE ASSIGN-
MENTS, TO SPERRY GYROSCOPE COMPANY, INC., OF BROOKLYN, NEW YORK, A
CORPORATION OF NEW YORK

AUTOMATIC PILOT FOR SHIPS

Application filed May 16, 1924. Serial No. 713,711.

This invention relates to automatic pilots for ships and other dirigible craft. In prior systems of automatic steering for dirgible craft, the automatic pilot usually works through the ship's existing telemotor system, the auto-pilot being added as an adjunct to the standard hand-controlled steering apparatus. The proper operation of such a system, however, is largely dependent upon the accurate functioning of the telemotor, but as is well known, ships' telemotors are many times leaky and otherwise defective. While such defects are not vital when steering by hand, they become very serious when steering automatically. It often times happens, therefore, that the automatic pilot is blamed for troubles which are entirely due to the ship's telemotor system.

One of the objects of the present invention is to render unnecessary the use of the ship's telemotor when the automatic pilot is in operation and to devise an alternative system for use at such times.

Another object of the invention is to devise an all-electric telemotor system which may be used with or without the automatic pilot feature, and which may replace entirely the hydraulic telemotor. In connection with this feature, I provide special means whereby the ship may be steered from the same master wheel, either with or without automatic guidance from the compass in maintaining a set course. When steering entirely by hand, that is, without the compass, I provide means for throwing out certain adjustments and special features which are important only when steering automatically.

A further object of the invention is to provide means for showing the pilot at the wheel exactly what the rudder is doing in relation to the movements of the master controller.

A further object of my invention is to improve upon the system of automatic steering shown in my prior application, now Patent No. 1,695,615 dated December 18, 1928.

Further objects of the invention will become apparent as the description proceeds.

Referring to the drawings in which what I now consider the preferred form of my invention is shown.

According to the present invention, I place much of the mechanism heretofore placed in or near the master controller, adjacent the steering engine or rudder excepting only the necessary parts of the controller itself. As shown, the master controller M is surmounted by a standard repeater compass R and comprises merely a contactor, the positions of which are governed jointly by the gyro compass through a repeater motor, by a follow-up connection with the rudder and preferably also by a manual adjustment. These three variables may be combined in a number of different ways, one of which I have illustrated by way of example.

Figure 1:
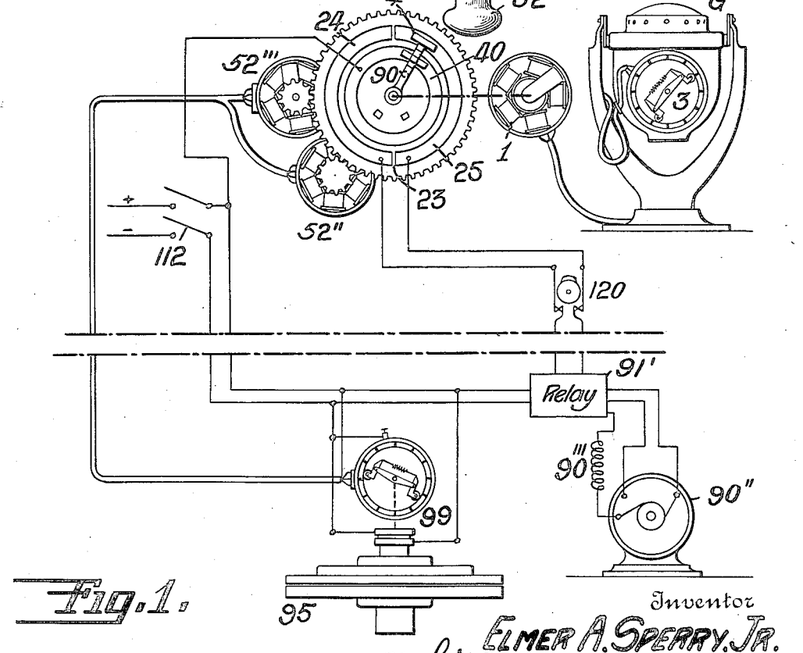
Fig. 1 is a wiring diagram showing diagrammatically the operation of my invention.
Figures 3, 16:
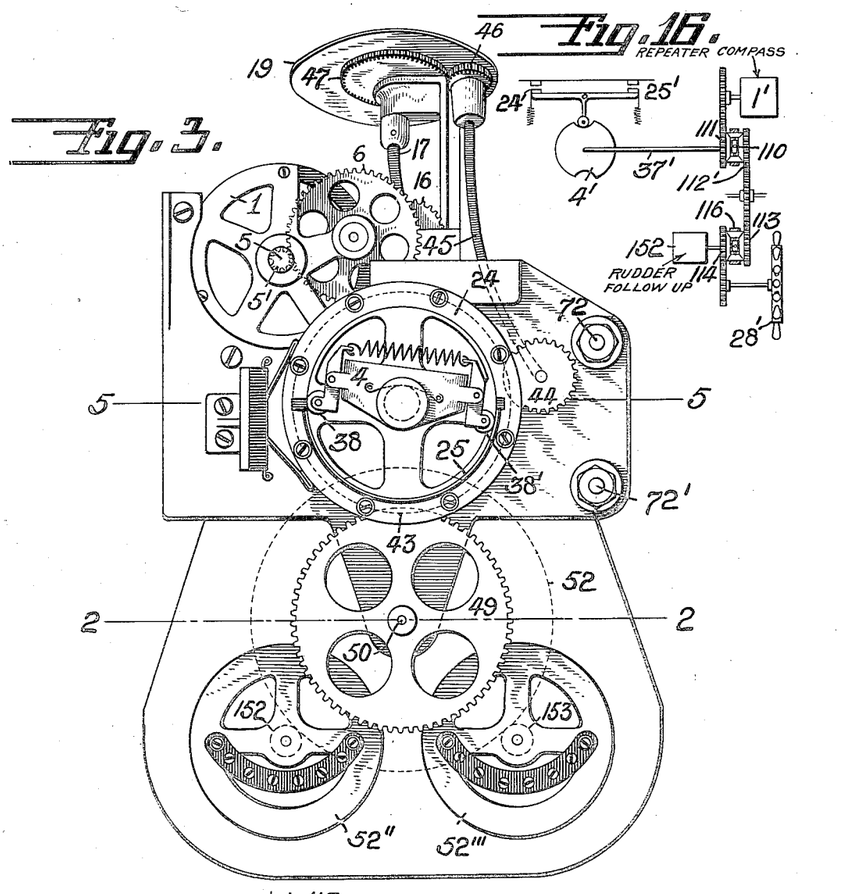
Fig. 3 is an elevation of the principal portions of the master controller.
Fig. 16 shows a modified form of contactor.
Figure 4:
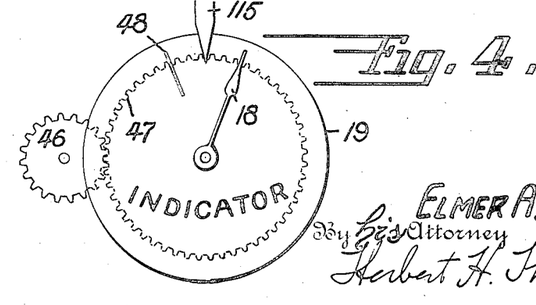
Fig. 4 is a face view on an enlarged scale of the rudder position indicator.
Figures 5, 6, 7:
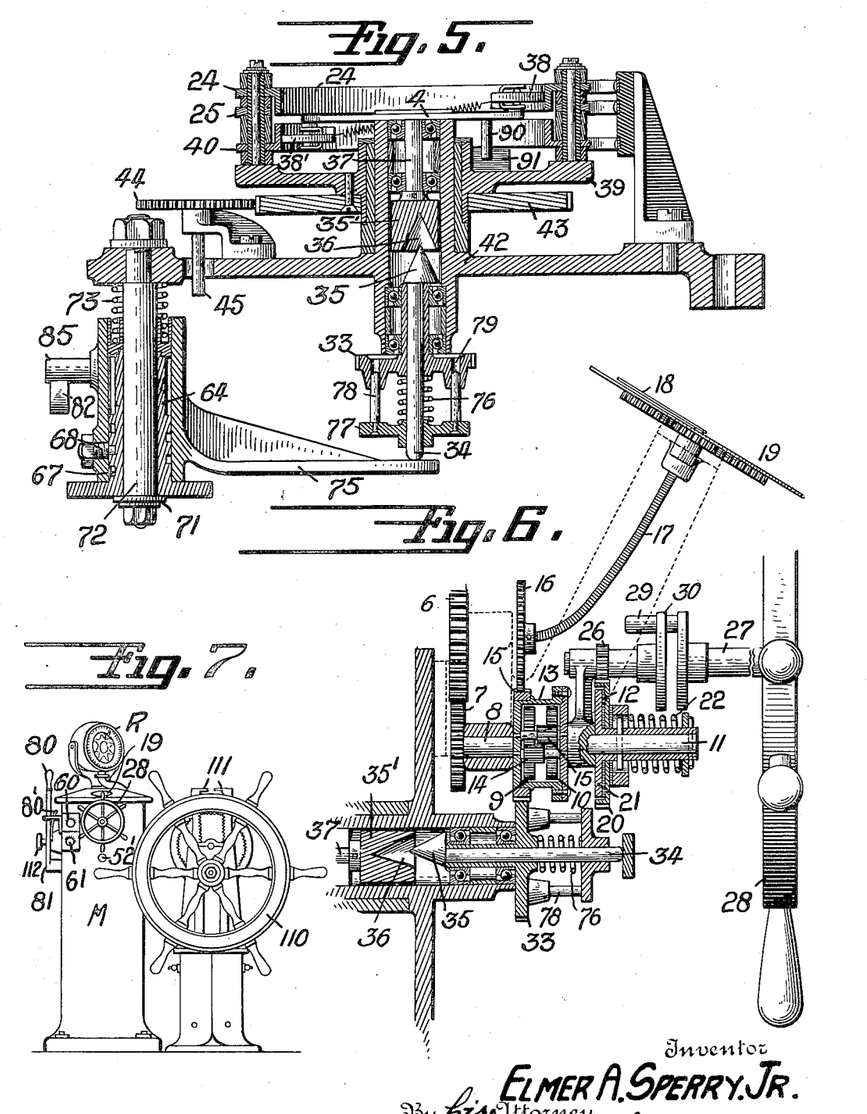
Fig. 5 is a section on approximately line 5—5 of Fig. 3.
Fig. 6 is a section at approximately right angles to Fig. 5.
Fig. 7 is a front elevation on a small scale of the master controller mounted beside a standard pilot wheel.

Repeater motor 1 is adapted to be driven from a gyro compass in the usual manner. In Fig. 1 the gyro compass is diagrammatically shown at G and the transmitter thereon being diagrammatically shown at 3. It will be understood that said transmitter 3 causes synchronous rotation of the compass repeater motor 1 in the usual manner. Said repeater motor is connected to drive directly or indirectly the contact element 4 of the master controller. One specific means for effecting this drive is shown in Figs. 3, 5 and 6 in which I also show my preferred means for altering the course. Mounted on the shaft 5 of the repeater motor is a pinion 5' meshing with a gear 6. Said gear, in turn meshes with a gear 7 mounted on a shaft 8, carrying a gear 9 at its inner end. Opposite gear 9 is a gear 10 on shaft 11 on which is secured a clutch face 12. The two gears 9 and 10 form two elements of any form of differential gearing. As shown, said gears are enclosed within the hollow drum 13, which drum forms the third or planetary element of the gear train and carries the meshing spur pinions 14 and 15, the former also meshing with gear 9 and the latter with gear 10. On the outside of said drum is placed a spur gear 15', which meshes with a gear 16 having a flexible shaft 17 secured thereto. Said shaft serves to rotate the pointer 18 on the little indicator 19 located on top of the master controller (Figs. 3, 4 and 7). Shaft 11 is rotated by gear 20 having a slip friction connection 21 with the clutch member 12, the parts being normally pressed together by the spring 22. This slip friction connection co-operates with a positive stop 90 (Fig. 5) on the master controller arm 4, which strikes fixed stops 91, to prevent the pilot from turning the master controller beyond approximately 180°; for, if the pilot did this, the ship would not be brought around in the direction in which he had turned the wheel but would be turned in the opposite direction, since the contact 4 (Fig. 1) would then be carried across the gap 23 between the contact strips 24—25.

Figure 8:
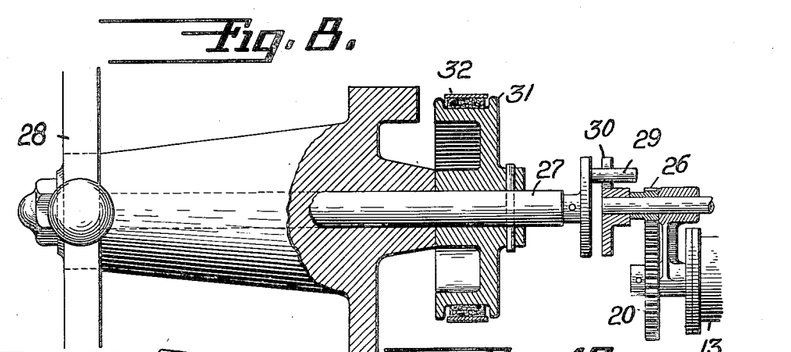
Fig. 8 is a top view of the auxiliary of the master pilot wheel, parts being shown in section.

Meshing with gear 20 is a pinion 26 rotated from the shaft 27 of hand or auxiliary pilot wheel 28 through a pin and slot connection 29—30, the details of which are shown in Fig. 8. It is by means of this wheel that the course is altered, when desired. Also, on the shaft 27 of said handwheel is a friction brake drum 31 on which bears a friction band 32 to prevent too ready turning of the wheel.

Also meshing with gear 15' is a gear 33 on shaft 34 (Fig. 6). As disclosed in my said prior application, I prefer to provide a lost motion connection or delayed action device between the compass and controller which I refer to as the "weather adjustment." On said shaft is eccentrically mounted a cone 35 so that as the shaft is revolved the point of the cone describes a circle about the center of the shaft. Beyond the cone is shown a complementary member 35' having a conical shaped, eccentrically located aperture 36 therein, which is adapted to receive the cone. It is obvious that by moving the cone toward or away from the member 35', the amount of lost motion between the shaft 34 and the shaft 37 of member 35' may be varied and thereby the lost motion between the gyro compass repeater motor and the master controller varied. Shaft 37 carries contact arm 4 upon which is mounted the contactors or trolleys 38—38'. One of said trolleys bears against the pair of spaced contactor rings 24—25, while the other bears against a continuous ring 40, the system being diagrammatically shown in Fig. 1.

I prefer that arm 4 be rotated through a much greater angle than the ship, when the latter turns so as to increase the sensitiveness of the controller to slight turns of the ship. This may readily be accomplished by employing a less gear reduction ratio between repeater motor 1 and arm 4 than is used between the gyro-compass G and its transmitter 3. For example, arm 4 may be geared to rotate through 10 to 20 times the angle that the ship turns through. By this means I am able to make my device very sensitive so as to hold the ship accurately on its course in calm weather. With such a sensitive arrangement, however, the steering engine would be run to destruction in rough weather on account of the rapid, large weather yaws. In rough weather, therefore, I am able to largely prevent such action by means of the weather adjustment or variable lost-motion connection above described. When this is introduced it allows an appreciable yaw of the ship without actuating the steering means.

As in my prior application, I bring in the follow-up from the rudder by rotatably mounting the contactor rings by securing them to supporting member 39 journaled on the exterior of the hub 42. Secured to said member 39 is a large gear 43, which drives the pinion 44. Said pinion drives flexible shaft 45 which, in turn, is connected to the pinion 46 meshing with the gear 47. On said gear is mounted the index plate 19, having a mark 48 thereon, which cooperates with the pointer 18 to show the relative positions of the master controller and rudder.

Gear 43 may be driven by any suitable means from the electrical follow-up from the rudder. As shown, it is rotated from gear 49 on shaft 50. At the opposite end of said shaft is mounted a member 35" which may be similar in function and construction to the member 35', and which has a similar conical shaped eccentric bore therein 36'. Opposite said bore is an eccentric cone 65' on shaft 34' journaled in bearing 51. By this means the "telemotor adjustment" or delayed action follow-up is secured. The purpose and effect of the weather and telemotor lost motion adjustments may be briefly summarized as follows: The weather adjustment is primarily for the purpose of preventing violent operation of the rudder by the automatic pilot in rough weather in a vain effort to stop the "false yaw" of the ship due to combined rolling and pitching. In addition, an artificial apparent "yaw" of the gyro-compass is sometimes set up due to its gimbal mounting under such conditions. By adjusting the lost motion between the repeater and the controlling contacts, the movements of the rudder may be confined to permanent changes in heading of the ship. The telemotor lost motion, on the other hand, secures quite a different and very important result, namely, it provides a simple means for increasing the throw of the rudder for the first increment of deviation of the ship from its course and also when the ship reverses its direction of yaw, so that the yaw of the ship in hunting about its true course is suppressed and kept at a minimum. The amount of this meeting action imparted to the rudder is, of course, readily adjusted by varying the lost motion as described. Both of these refinements are, of course, of much greater importance when steering automatically than when steering by hand, and as the helmsman is accustomed to steering without such refinements, I prefer to eliminate them when the auto-pilot is disconnected, as hereinafter explained.

Shaft 34' is rotated by large gear 52 having a non-rotatable but slidable connection with the shaft so as to permit relative axial movement of the shaft with respect to the gear. It is normally rotated by one or more follow-up repeater motors 52''—52''' through pinions 152—153 on the shafts of the motors (Fig. 3). Said motors being actuated by a transmitter, hereinafter described, adjacent the rudder. An adjusting or synchronizing knob 52' is provided for shaft 34' for the purpose of synchronizing the controller with the rudder at the time it is thrown in. This is effected by bringing the rudder to the central position and adjusting knob 52' to bring mark 48 (Fig. 4) to index 115 at this time.

The axial movement of the shafts 34 and 34' may be effected by similar means. For this purpose I provide knurled wheels 60—61 on shafts 62—63. When wheel 60, for instance, is rotated for the weather adjustment (Fig. 9), it rotates sleeve 64 by means of the pin and slot connection 66. Said sleeve has formed in the outer surface thereof a spiral groove 67 into which projects a pin 68 secured to the non-rotatable sleeve 69. The sleeve 64, however, is prevented from moving axially by a locknut 71 on the end of the shaft 72 secured to the frame and by the relatively stiff compression spring 73 which projects between the fixed frame and the recessed a washer. When, therefore, inner sleeve 64 is rotated, the outer sleeve 69 is given an axial movement.

Figure 2:
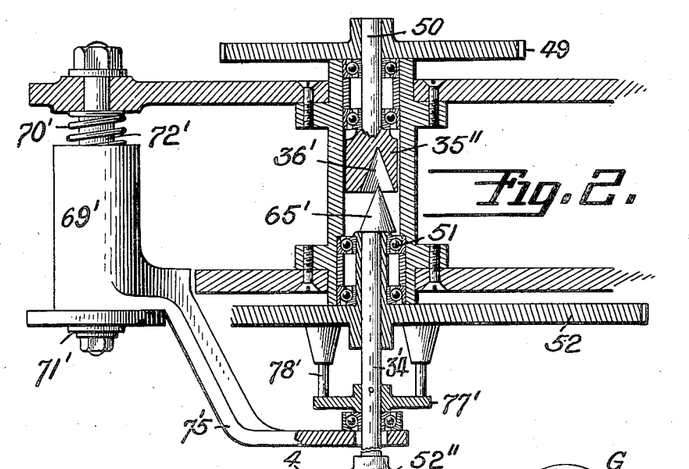
Fig. 2 is a cross section on line 2—2 of Fig. 3 showing the lost motion connection in the follow-up system.

Secured to said outer sleeve is an arm 75 which bears against the outer end of shaft 34 (Fig. 5). Said shaft is yieldingly pressed against said arm or foot 75 by spring 76 which bears, at its upper end, against the axially fixed gear 33 and, at its lower end, against collar 77 fixed to the shaft. If desired, guide pins 78 may be provided on the collar which extend into apertures 79 in the gear so that the gear is slidable but non-rotatable with respect to the shaft. It is understood, that the construction just described, may apply to both lost motion devices, the construction of the telemotor adjustment being shown in Fig. 2, where sleeve 69' is shown as having arm 75' thereon which supports collar 77' fixed to shaft 34'.

Figures 9, 10, 11, 12:
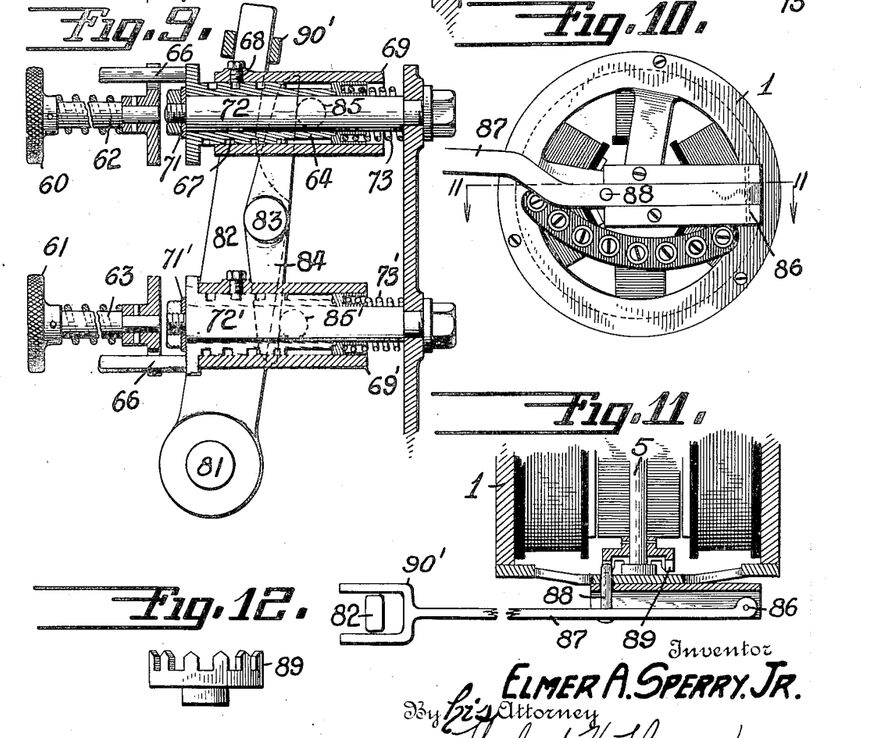
Fig. 9 is a sectional view showing the means for throwing out both lost motion devices.
Fig. 10 is a rear view of the compass repeater motor.
Fig. 11 is a section taken on line 11—11 of Fig. 10.
Fig. 12 is a detail of the toothed locking device for the motor.

As above stated, when it is desired to steer entirely by hand, I prefer to eliminate both lost motion connections. Preferably, I accomplish this by one movement of a handle 80 (Fig. 7). Said handle is secured to a shaft 81 running within the master controller box and having secured thereto an arm 82 (Fig. 9). Said arm has fixed thereon a pin 83 on which is swiveled a rocker arm 84. Rocker arm 84 in turn, at the upper end, bears against pin 85 secured to sleeve 69. At its lower end, said arm bears a similar pin 85' on the sleeve 69'. It will be readily apparent that by rotating arm 82 clockwise in Fig. 9, that both sleeves 69 and 69' will be moved to the right against the action of springs 70 and 71', thereby causing the cones 65—65' to enter completely the conical apertures 36—36', which, of course, eliminates all lost motion. A spring catch 80' (Fig. 1) may be provided to hold the handle 80 and arm 82 in this position.

As at the time the compass may be disconnected, I also provide means to lock the compass repeater element as otherwise the turning of the handwheel would turn it through the differential instead of the contact, as the motor may be de-energized at that time. Even if the motor is not deenergized at this time, or if the course changing were introduced by adjusting the follow-up contacts 24—25 instead of the trolleys 38—38', the lock is effective in preventing the motor being turned thus facilitating quick maneuvering of the ship by preventing the compass from moving the trolley as the ship minds her helm. Preferably the locking means is simultaneously operated with the lost motion eliminating device. As shown, I pivot at 86 adjacent one end of the compass repeater motor, an arm 87 having a pin 88 thereon, which is adapted to engage, when moved upwardly, in Fig. 11, a crown-toothed member 89 on the shaft 5 of the motor 1, thereby locking the motor shaft against movement. Lever 87 is preferably operated from the arm 82. For this purpose lever 87 has a fork 90' thereon engaging the arm 82, as shown in Figs. 9 and 11 so that when the arm 82 is moved to the right in Fig. 9, corresponding to an upward movement in Fig. 11, lock-pin 88 will engage teeth 89.

Figures 13, 15:
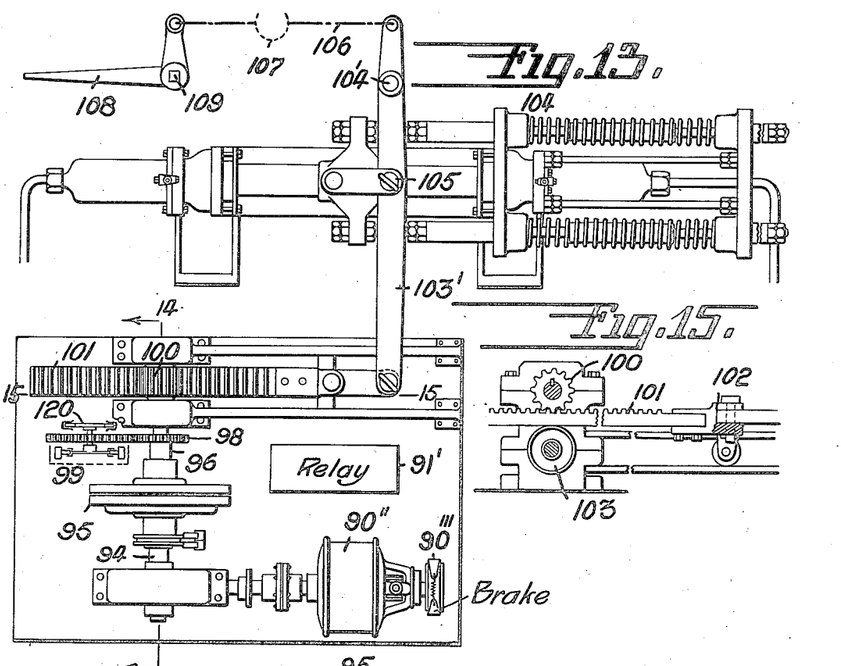
Fig. 13 is a diagrammatic plan view of the mechanism employed adjacent the steering engine.
Fig. 15 is a section on approximately line 15—15 of Fig. 13.
Figure 14:
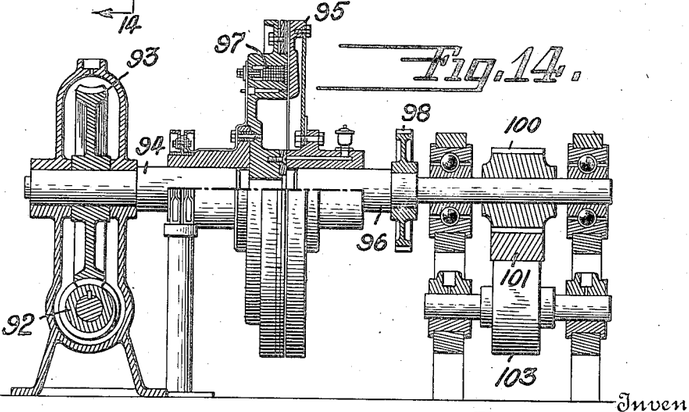
Fig. 14 is a vertical section, partly in elevation, taken on line 14—14 of Fig. 13.

All other parts formerly associated with the master controller, I now prefer to remove therefrom and place adjacent the steering engine, as shown in Figs. 13 and 14.

In these figures the reversible motor 90'' is controlled from the contacts on the master controller through a suitable relay 91' (Figs. 1 and 13). An electro-magnetic brake 90''' working on the elevator principle is preferably placed on the shaft on the motor. Said motor may serve to actuate the valve of the usual steering engine or it may be used to turn the rudder directly. As shown the motor drives the worm 92 which meshes with the worm wheel 93 on shaft 94. While said shaft may be directly coupled to the valve of the steam steering engine, I prefer to provide a clutch 95 between said shaft and shaft 96 when the system is used in connection with a telemotor system. Said clutch is shown as a friction clutch operated electro-magnetically by means of windings 97, so that when the windings 97 are energized the clutch is closed and the two shafts coupled together. On shaft 96 is mounted a gear 98 which may serve to drive the follow-up or repeat-back transmitter 99 in circuit with the repeater motors 52'' and 52''' above described. Also on said shaft is a pinion 100 meshing with a slidable rack bar 101 which may be supported on carriage 102 and a central roller 103. Said bar is linked adjacent its outer end to the rudder operating lever 103' of the telemotor 104. Said lever is shown as pivoted at 104' and as pivotally connected at 105 to a ship's telemotor 104. At its opposite end, said lever is represented as linked to a controller rod 106, which is adapted to operate the valve of the steering engine, represented diagrammatically at 107, the ship's rudder being diagrammatically represented at 108 with the rudder post at 109. Limit switches 120 for the motor are also provided.

The operation of my invention is as follows:

With the apparatus as shown, the vessel may be steered by three different systems. First, the vessel may be steered in the ordinary way from the large pilot wheel 110 which operates through the usual telemotor rack bars 111, which, in turn, control the telemotor 104 near the steering engine, said telemotor, in turn, operating the lever 103' in the usual manner. When this system is being used, however, it will be evident that all resistance to the moving of the rack 101 must be removed as otherwise the telemotor will be unable to rotate the lever 103'. It is for this purpose that I provide the clutch 95 which is deenergized at this time. This may be readily accomplished by placing the clutch in the same circuit with the electric automatic control so that by opening the one master switch 112, adjacent handle 80 (Figs. 7 and 1), the complete electric system may be paralyzed and the clutch deenergized. Also, if the electric power should fail the clutch is at once released, leaving the telemotor system free to centralize the rudder. The steering wheel 110 is thus rendered instantly available for steering through the telemotor system.

Assuming now that the pilot has left the harbor and is desirous of turning over the operation to the automatic pilot. First he brings the rudder to the central or zero position and adjusts knob 52' to bring index 48 to zero. All he has to do is to then set, by means of the auxiliary pilot wheel 28, pointer 18 to zero and throw in the master switch 112. This automatically throws in the entire automatic system and energizes the clutch 97. Since the telemotor has no function in the automatic system, it may, if desired, be rendered inoperative at this time as by opening the bypass valve (not shown) in the telemotor line, thus preventing the pilot wheel from turning back and forth with the movements of the rudder. If it is desired to change the course, all the pilot has to do is to adjust the auxiliary pilot wheel 28 until the ship comes on the new course. Also, at the time that the automatic steering is thrown in, the handle 80 should be in the out or unlocked position so that the lost motion devices, which constitute the "weather" and "telemotor" adjustments, may be in at the time. These adjustments are, of course, varied by means of the handwheels 60—61 to suit the conditions of wind and weather for the purposes explained at greater length in my aforesaid patent application.

If now the pilot desires to make a quick, large change of course or to take over the steering of the ship for the time without interference from the compass, he may either go back to steering with the large wheel 110 or he may steer through wheel 28 by throwing the handle 80 back, thus eliminating the lost motions referred to and locking the repeater compass motor. He then may steer by hand through the auxiliary wheel 28 with just as great facility and with much less labor than by the regular pilot wheel 110. In fact, it would be possible to omit the regular pilot wheel 110 with the telemotor system entirely, according to my invention and control the ship entirely from the small master controller.

The indicator 18—19—48 furnishes a valuable indication to the helmsman of the movement of the rudder as compared to the position of the contactors. Said indicator shows at a glance the effect of the introduction of the lost motion, showing how the overthrow of the rudder is accomplished and also aids in the synchronizing operation as explained.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

It is quite obvious, for instance, that the master controller contactor may be made of quite different form than heretofore described, as long as the variables are properly introduced. For instance, Fig. 16 suggests in diagrammatic form, a quite dissimilar mechanical design, but by which the same result may be secured. In this figure the revolving arm and segments are replaced by two pairs of contacts 24'—25', one pair being closed by rotation of cam 4' in one direction and the other pair by opposite rotation. Instead of bringing in one of the variables through a follow-up sector, I here show all three as combined through differentials before reaching the cam. Thus shaft 37' of cam 4' may be connected to the planetary arm 110 of a differential gear train, while one arm 111 is geared to compass repeater motor 1' and the other arm 112' to an arm 113 of a second differential gear train. The opposite arm 114 of said second train may be operated from the hand wheel 28' while the planetary arm 116 is coupled to the rudder follow-up motor 152.

Having described my invention, what I claim and desire to secure by Letters Patent is:

1. In an automatic pilot attachment for ships, the combination with the usual pilot wheel, telemotor and steering engine, of a compass governed controller, a motor actuated therefrom for controlling the steering engine, an electrical follow-up system connecting said motor and controller, means for disconnecting the motor when steering by the usual pilot wheel, and means for throwing out of action the telemotor when steering automatically.

2. In an automatic pilot for ships, a master controller including a compass controlled part and a lost motion device for the purpose specified, a hand wheel for altering the setting of said controller to change the course, a stop to prevent turning of said controller through more than a predetermined angle, and means whereby the ship may be steered entirely from said wheel, including a locking means for the compass controlled part.

3. In an automatic pilot for ships, a master controller including a compass controlled part and a lost motion device for the purpose specified, a hand wheel for altering the setting of said controller to change the course, and means whereby the ship may be steered entirely from said wheel, including a locking means for the compass controlled part, and means for cutting out said lost motion device.

4. In an automatic pilot for ships, a master controller including a compass controlled part and a lost motion device for the purpose specified, a hand wheel for altering the setting of said controller to change the course, and means whereby the ship may be steered entirely from said wheel, including a locking means for the compass controlled part, means for cutting out said lost motion device, and a common actuator for the two last named means.

5. In a ship's steering system, the combination with the pilot wheel and telemotor remote control for the rudder, of an auxiliary electrical controller, a motor actuated thereby, detachable means connecting the motor and rudder control, and an electrical follow-back system operated by the rudder control.

6. In a ship's steering system, the combination with the pilot wheel and telemotor remote control for the rudder, of an auxiliary electrical controller, a reversible motor actuated thereby, detachable means connecting the motor and rudder, a follow-back system operated from the rudder, and automatic means for detaching said connecting means when said auxiliary electrical controller is not in operation.

7. In ship steering mechanism, the combination with a master controller, of a lost motion device therein comprising a pair of spaced rotatable shafts, a conical member eccentrically positioned on one of said shafts, a member on the other shaft having a complementary eccentrically positioned recess therein, and means for adjusting the relative axial position of said shafts for varying the amount of lost motion therebetween.

8. In ship steering mechanism, the combination with a two part master controller, of a lost motion device in each part thereof, each device comprising a pair of spaced rotatable shafts, a conical member eccentrically positioned on one of said shafts, a member on the other shaft having a complementary eccentrically positioned recess therein, and means for adjusting the relative axial position of said shafts for varying the amount of lost motion therebetween, and a common means for eliminating the lost motion in each device.

9. In an automatic pilot for ships, a master controller including a compass controlled part, a rudder controlled part, and a lost motion device for each for the purpose specified, a hand wheel for altering the setting of said controller to change the course, and means whereby the ship may be steered entirely from said wheel, including means for cutting out both of said lost motion devices.

10. In an automatic pilot for ships, a master controller including a compass controlled part and a lost motion device for the purpose specified, a hand wheel for altering the setting of said controller to change the course, and means whereby the ship may be steered entirely from said wheel, including means for cutting out said lost motion device.

11. In an automatic pilot, the combination with a master compass, of a master controller comprising a pair of relatively movable contacts, the relative position of which is normally governed by said compass, a hand setting device for altering said relative position to alter the course, a slip friction connection associated therewith, and a stop for preventing a greater change in said relative position than a predetermined angle for the purpose specified.

12. In a controller for automatic steering devices for ships having one or more adjustable delayed-action devices for the purpose specified, of manual means for altering the course through said controller, an indicator on said controller for showing the setting of said means, and a rudder position indicator mounted adjacent said first named indicator whereby the effect of said delayed action devices may be observed.

13. In an automatic steering device for ships having a follow-up from the rudder and an adjustable lost-motion means therein for the purpose specified, an indicator for showing the setting of said device, and a rudder position indicator mounted adjacent said first named indicator whereby the effect of said lost-motion means may be observed.

14. In an automatic pilot for ships, a master controller including a compass controlled part, manual means for altering the course through said controller, means for imparting to the rudder a meeting action to prevent yaw, and means for minimizing the effect of said last named means whereby said manual means may be operated without interference therefrom.

15. In an automatic pilot for ships, a master controller including a compass controlled part and a plurality of delayed-action devices for the purpose specified, a hand wheel for altering the setting of said controller to change the course, and a two-position means on said controller whereby the ship may be turned quickly from said wheel without interference from said devices, said means in one position eliminating the delay due to said devices and in the other position rendering said devices operative.

16. In an automatic pilot, the combination with the master controller having a follow-up device and adapted to be located in the pilot house and a remotely located steering engine, of an electrical transmitter actuated when the steering engine turns, a repeater motor connected to said follow-up device of the master controller and actuated from said transmitter, and a delayed action mechanism between said repeater motor and said follow-up device.

17. A steering device for ships comprising an electric controller in the pilot house, an electrically controlled steering engine adjacent the rudder, compass controlled means governing said electrical controller for automatic steering, a follow-up between the said steering engine and controller, a hand steering device also operating through said electrical controller to electrically control said steering engine, and means for rendering inoperative the compass control means when steering by hand.

18. A steering device for ships comprising an electric controller in the pilot house, an electrically controlled steering engine adjacent the rudder, compass controlled means governing said electrical controller for automatic steering, an electrical follow-up between the said steering engine and controller, a hand steering device also operating through said electrical controller to electrically control said steering engine, and means whereby said hand steering device may operate either in conjunction with or without interference from said compass control means.

19. In an automatic pilot for ships, the combination with the ship's compass, of a controller for the rudder comprising relatively rotatable contactors, means for rotating one of said contactors from the compass through a greater angle when the ship turns than the angle indicated by the compass, including a lost motion device and means for varying the amount of lost motion for varying weather conditions.

20. In an automatic pilot for ships, the combination with the ship's compass, of a controller for the rudder comprising relatively rotatable contactors, means for rotating one of said contactors from the compass through an angle when the ship turns which is a plurality of times greater than the angle through which the ship turned, and means for reducing the sensitivity at will comprising a variable lost motion device in the connections between said contactor and rotating means.

21. In an automatic pilot for ships, the combination with the ship's compass having a transmitter geared thereto to rotate at multiple speed, of a controller for the rudder comprising relatively rotatable contactors, a repeater motor actuated from said transmitter, connections between said motor and controller to move the same through greater angles than the ship turns, and means for introducing lost motion in said connections for rough weather steering.

In testimony whereof I have affixed my signature.

ELMER A. SPERRY, Jr.